June 25, 1968     P. GROSS     3,389,479

TEACHING AND TESTING DEVICE

Filed Aug. 3, 1965     2 Sheets-Sheet 1

INVENTOR
Philip Gross

BY *Clive H. Bramson*

ATTORNEY

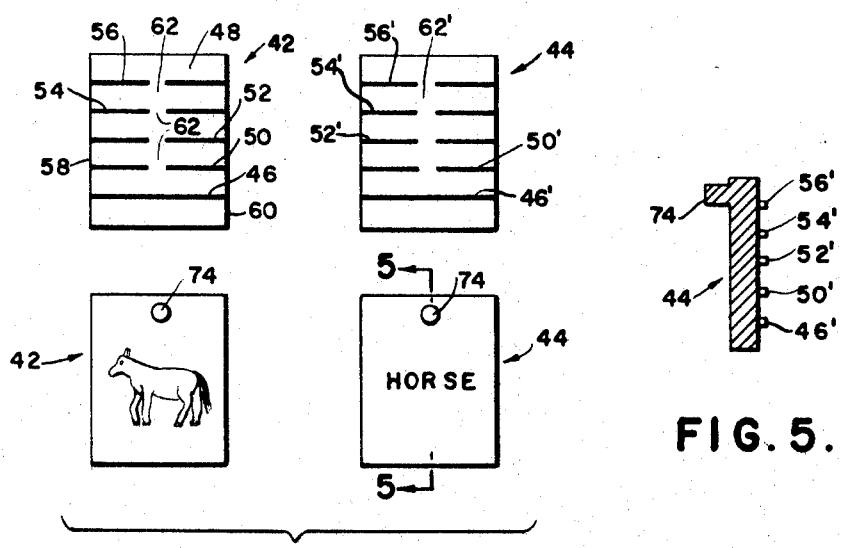
FIG. 4.
FIG. 5.
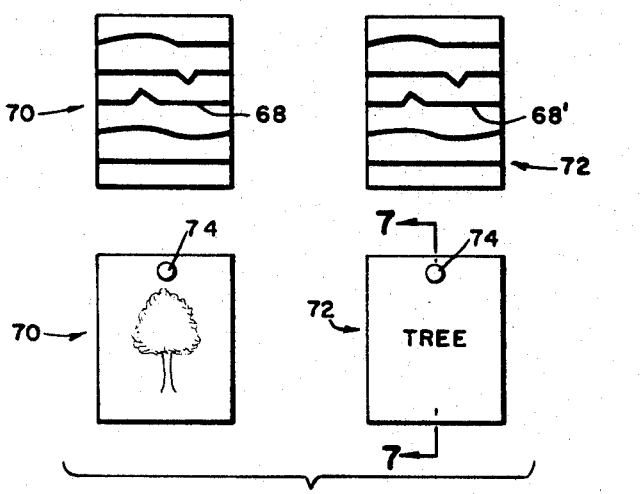
FIG. 6.
FIG. 7.
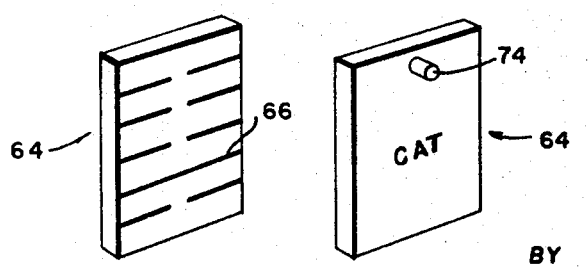
FIG. 8.  FIG. 9.
INVENTOR
Philip Gross
BY Clive H. Bramson
ATTORNEY 3,389,479
TEACHING AND TESTING DEVICE
Philip Gross, 1374 Ocean Ave.,
Brooklyn, N.Y. 11230
Filed Aug. 3, 1965, Ser. No. 476,853
5 Claims. (Cl. 35—9)

ABSTRACT OF THE DISCLOSURE

A teaching and testing device in which a dielectric support, having a pair of electrically connected recessed areas, receives a pair of matching question and answer plaques to complete a circuit through an electric power source and indicating means, each plaque having exposed conductive and non-conductive strips on the rear surface thereof, the two types of strips being visually indistinguishable with respect to color and composition.

This invention relates to educational devices and more particularly to a self-instruction apparatus which affords amusement to the user concurrently with its primarily intended educational purpose.

The present invention is essentially directed to the provision of a plurality of corresponding question and answer plaques, proper pairs of which will, when placed within respective recesses of a support board, complete an electrical circuit including a power supply and indicating means, the latter, preferably an electric light, being thereby energized.

Consonant with the foregoing, an object of the instant invention is to provide an educational device wherein the electrical conducting means of each plaque is applied surfacedly thereof, thereby minimizing the manufacturing costs without sacrificing any advantages of the invention.

Another object of this invention resides in the provision of an educational device of the foregoing character wherein the electrical conducting means of each plaque is visually identical thereby eliminating any noticeable correspondence between pairs of question and answer plaques which would otherwise enable the user to match said pairs without actual knowledge of the question and answer correlations.

A further object of the present invention is to provide an educational device for children which is adapted to utilize numerous sets of question and answer plaques, each set pertaining to different subject matter.

A still further object of the invention resides in the provision of an educational device of the described character wherein the circuitry thereof may be printed, etched, painted, wired and the like.

Another object of the present invention resides in the provision of an educational device including a plurality of question and answer plaques having electrical conductive and non-conductive strip members disposed surfacedly thereof, said strip members being arranged randomly with respect to one another but extending between two edges of a respective plaque.

Another general object of the present invention is to provide a device of the described character which will be simple in structure and highly effective in use.

Other objects and advantages of the instant educational device will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate the invention, and together with the description, serve to explain the principles of the invention.

FIGURE 4 is an illustration of the obverse and reverse surfaces of a pair of exemplary question and answer plaques, the conductive and non-conductive strip members thereof being arranged in parallelism;

FIGURE 5 is a side elevational cross-sectional view taken along line 5—5 of FIGURE 4;

FIGURE 6 is an illustration of a pair of question and answer plaques according to a modified embodiment, the conductive and non-conductive strip members thereof being arranged in random relation as shown;

FIGURE 7 is a side elevational cross-sectional view taken along 7—7 of FIGURE 6;

FIGURE 8 is a perspective view of a plaque illustrating the conductive and non-conductive strip members disposed on the rear face thereof; and FIGURE 9 is a perspective view of an answer plaque illustrating the front face thereof.

Figure 1:
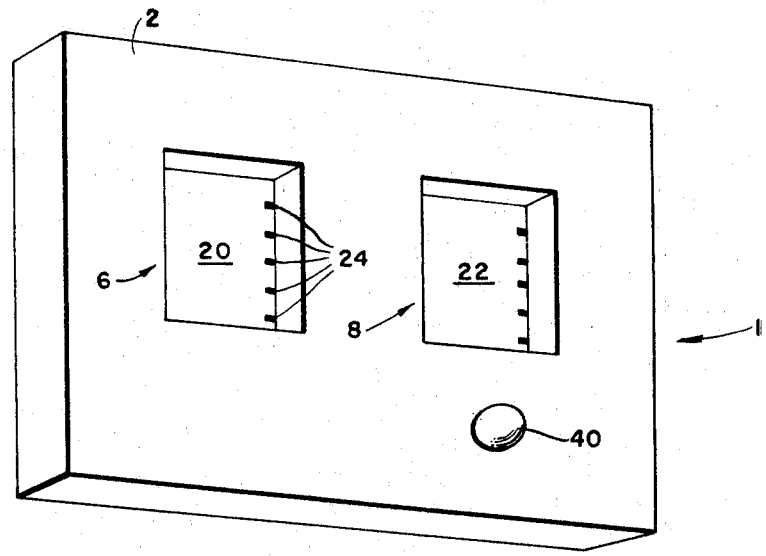
FIGURE 1 is a perspective view of the dielectric support member showing two spaced recesses disposed therewithin.
Figure 2:
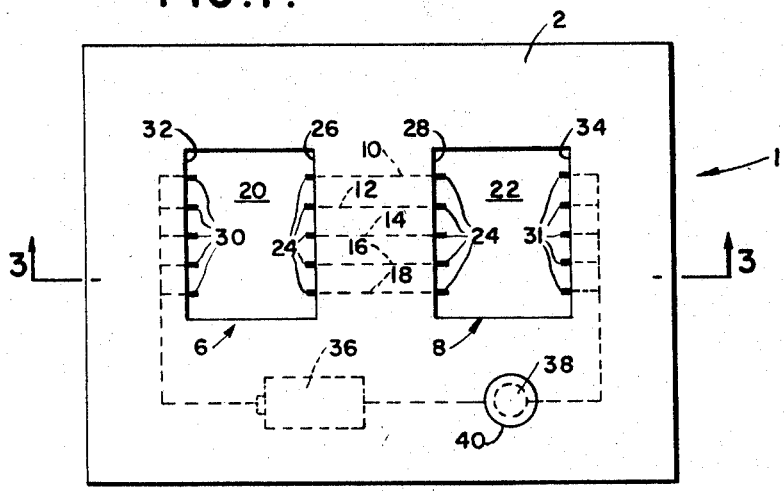
FIGURE 2 is a plan view of the obverse side of the support member showing the conductive strip elements extending from one recess to the other, a battery power source and an electrical socket for supporting an electric light.
Figure 3:
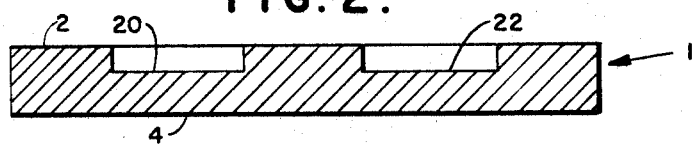
FIGURE 3 is a side elevational cross-sectional view of the support member taken along line 3—3 of FIGURE 2.

Referring now in detail to the invention illustrated in the accompanying drawings, FIGURES 1-3 show the dielectric support member designated generally by numeral 1 in the various positions heretofore described.

More specifically, the support member component of the present educational device may be of generally rectangular configuration as shown, although other suitable shapes are within the contemplation of the invention. Support member 1, having obverse and reverse surfaces 2 and 4, respectively, includes recesses 6 and 8, formed within said obverse surface, said recesses being spaced as shown.

Conductive strip elements 10, 12, 14, 16 and 18 extend from the base surface 20 of recess 6 to the base surface 22 of recess 8, the terminal or end portions 24 of each said strip element being exposed within said respective recesses as shown in FIGURE 2 and partially in FIGURE 1. The portions of said strip elements disposed between said recesses may be concealed as illustrated in broken line. Said portions may, however, be provided surfacedly of said support member. As will be seen, said exposed portions are provided adjacently of sides 26 and 28 of recesses 6 and 8, respectively.

Conductive means or bus connectors 30 and 31 are provided within said recesses 6 and 8, respectively, as shown, the location of said conductive means being adjacent sides 32 and 34 of said respective recesses and opposed to and spaced with respect to end portions 24 as will be observed. Said conductive means 30 and 31 are each electrically connected to battery 36 and electrical lamp socket 38, said battery and lamp socket being located outside of said recesses and fastened beneath the obverse surface 2 of said dielectric support member. Preferably, only electrical lamp 40 is visible to the user of the present device as shown in FIGURES 1 and 2 of the drawings.

Accordingly, it will be appreciated that electric lamp 40, or any other suitable indicating means employed in lieu thereof, will be energized only when one of said conductive strip elements 10, 12, 14, 16 and 18 is electrically connected to a respective bus connector 30 and 31 whereby the circuit including the power source 36 and lamp 40 will be completed.

Question and answer plaques to be described hereinbelow following and which are removably receivable within said recesses, when properly selected, will effectuate completion of the circuit to thus actuate the indicating means.

To that end reference is now made to FIGURE 4 of the drawings wherein preferred question and answer plaques 42 and 44, respectively, are shown. Question plaque 42, formed of dielectric or insulating material which may be similar to that used in the construction of the support member, is provided with exposed conductive strip member 46 on the rear face 48 thereof and exposed non-conductive strip members 50, 52, 54 and 56 on said rear face, said conductive and non-conductive strip members being arranged in substantially parallel, spaced relation and extending between edges 58 and 60 of said plaque. As will be noted, gapped regions 62 provided intermediate strip members 50, 52, 54 and 56 preclude electrical conduction therethrough and hence said strips are said to be non-conductive. Said gapped regions 62, however are sufficiently small so as to be virtually non-discernible to the naked eye, the choice, therefore, of the matching question and answer plaques being independent of the arrangement or position of the conductive strip member since said member cannot be distinguished from said non-conductive strip members. The answer plaque 44 is constructed in the same manner as said question plaque and the conductive strip member 46' which corresponds to member 46 is also provided on the rear face thereof in the same manner. Accordingly, non-conductive strip members 50', 52', 54' and 56' are similarly provided to correspond with respective members of question plaque 42, and include gapped regions 62' as aforedescribed. Said members similarly extend between the opposite edges of said answer plaque although the extension of said question and answer plaque strip members can be arranged to extend between adjacent edges as well with corresponding modification, of course, with respect to the arrangement of the conductive strip elements and conductive means provided on said support member. Thus, placement of said plaques 42 and 44 with respective recesses 6 and 8 will complete the circuit including conductive strip element 18 to thereby cause lamp 40 to be lighted and thus indicating a correct plaque match, i.e., the picture of a horse and the answer "horse." Should, however, the answer plaque 64, e.g., shown in FIGURES 8 and 9 be selected instead of answer plaque 44, the lamp would not light since conductive strip member 66 would contact conductive strip element 16 rather than element 18 which is contacted by member 46. That is, a circuit including power source 36 and indicating means 40 would not be completed, indicating that the proper matching answer plaque was not selected.

The conductive and non-conductive strip members may be formed of wire, or may be preferably painted or printed with electrically conductive material, any other suitable means being, however, utilizable. The non-conductive strip members may be formed of dielectric material whereby the gapped regions 62 and 62' may be eliminated. The essential requirement, however, is that said conductive and non-conductive strip members be visually identical with respect to color and composition, there being no distinguishing features therebetween.

In the embodiment illustrated herein, five question and five answer plaques will constitute a set, inasmuch as there are five conductive strip elements which align with the five conductive and non-conductive strip members of each question and answer plaque. Accordingly, a variation of the number of said respective strip elements and members will permit the number of plaques per set to increase or decrease as may be desired. Further, in consonance with the embodiment shown, the same support member may be used with different sets of ten question and answer plaques, said different sets being related to differing subject matter.

Referring now to an alternate embodiment shown in FIGURES 6 and 7 of the drawings, it will be understood that numerals 68 and 68' designate the conductive strip members, respectively, of question and answer plaques 70 and 72, respectively. The remaining strip members are, in accordance with the foregoing, of insulative, non-conductive character, and do not, therefore, require a gapped region to preclude electrical conductivity therethrough. Said members are arranged in random relation, thereby illustrating the parallelism is not required, the essential condition, however, being that the portions of each strip members adjacent an edge of the plaque are in contacting alignment with end portions 24 of said strip elements and bust connectors 30 and 31.

A knob 74 is provided as shown on each plaque to facilitate the placement and removal thereof within the recesses as described.

Accordingly, it will be appreciated that the present educational device may be utilized by people of all ages, depending upon the subject matter provided, the primary intention, of course, being to provide a device employing basic simplified subjects as illustrated, whereby the educational needs of young children will be fulfilled.

Although the preferred embodiments of the educational device have been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. An educational device comprised of a dielectric support member having two spaced recesses therein, a set of spaced conductive strip elements extending from one recess to the other, the respective terminal portions of said strip elements being exposed within said respective recesses, conductive means located within each of said recesses, said conductive means being spaced with respect to said respective terminal portions of said strip elements, the conductive means of each recess being electrically connected to an electrical power source and indicating means located outside of said recesses, a rigid dielectric question plaque including adjacent and opposed edges, said plaque having an exposed conductive strip member on the rear face thereof, a plurality of exposed non-conductive strip members on the rear face of said question plaque, said conductive and non-conductive strip members being arranged in spaced relation and extending between two edges of said plaque, a rigid dielectric answer plaque including adjacent and opposed edges, said answer plaque having an exposed conductive strip member on the rear face thereof, a plurality of exposed non-conductive strip members on the rear face of said question plaque, said conductive and non-conductive strip members being arranged in spaced relation and extending between two edges of said plaque, said question and answer plaques being removably receivable within one of said recesses, respectively, said indicating means being energized when said exposed conductive strip members of said question and answer plaques, respectively, due to the weight of said plaques, contactingly bear against a common conductive strip element to thereby complete a circuit including said common conductive strip element of said set of spaced conductive strip elements.

2. An educational device as defined in claim 1, wherein said conductive and non-conductive strip members are visually identical with respect to color and composition.

3. An educational device as set forth in claim 1, wherein said strip members are printed on the question and answer plaques and wherein said non-conductive strip members include a gapped region along the lengths thereof.

4. An educational device as set forth in claim 1, wherein said strip members of said question and answer plaques, respectively, are arranged in substantial parallelism.

5. An educational device as set forth in claim 1, wherein indicating means is an electric light.

References Cited

UNITED STATES PATENTS

| | | | |
|---|---|---|---|
| 2,997,793 | 8/1961 | Kelly | 35—9 |
| 3,137,079 | 6/1964 | Greuzard | 35—9 |
| 3,146,534 | 9/1964 | Brown | 35—9 |
| 3,252,230 | 5/1966 | Doney | 35—9 |

EUGENE R. CAPOZIO, *Primary Examiner.*

W. W. NIELSEN, *Assistant Examiner.*